(12) United States Patent
Suzuki

(10) Patent No.: US 8,306,957 B2
(45) Date of Patent: Nov. 6, 2012

(54) INFORMATION MANAGING APPARATUS AND COMPUTER-READABLE MEDIUM IN A MULTI-LAYER FILE SYSTEM

(75) Inventor: Yoshiharu Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 103 days.

(21) Appl. No.: 12/861,443

(22) Filed: Aug. 23, 2010

(65) Prior Publication Data

US 2011/0202579 A1    Aug. 18, 2011

(30) Foreign Application Priority Data

Feb. 18, 2010   (JP) .................................. 2010-033601

(51) Int. Cl.
   *G06F 17/30* (2006.01)
(52) U.S. Cl. ........................ 707/694; 707/758
(58) Field of Classification Search ................. 707/694, 707/758
   See application file for complete search history.

(56) References Cited

U.S. PATENT DOCUMENTS

| | | | | |
|---|---|---|---|---|
| 2005/0108625 A1* | 5/2005 | Bhogal et al. | ................. | 715/505 |
| 2007/0094471 A1* | 4/2007 | Shaath et al. | ................. | 711/163 |
| 2007/0179967 A1* | 8/2007 | Zhang | ........................... | 707/102 |
| 2008/0034003 A1* | 2/2008 | Stakutis et al. | ............... | 707/200 |

FOREIGN PATENT DOCUMENTS

JP    2007-087224 A    4/2007

* cited by examiner

*Primary Examiner* — Son T Hoang
(74) *Attorney, Agent, or Firm* — Sughrue Mion, PLLC

(57) ABSTRACT

An information managing apparatus includes an acquiring unit, a condition setting unit, a condition judging unit and a correlating unit. The acquiring unit acquires information from storage unit which stores information therein. The condition setting unit sets a condition on at least one layer of a file system. Information to be correlated with the at least one layer satisfies the condition as the information locates under the at least one layer. The condition is referred along with an attribute value of one or a plurality of lower layers provided under the at least one layer. The correlating unit correlates the acquired information with a lower layer if the condition judging unit judges that the acquired information satisfies the set condition when the attribute value of the lower layer is referred to. The lower layer corresponds to the condition judged to be satisfied by the condition judging unit.

7 Claims, 7 Drawing Sheets

| CONDITION-ASSOCIATED FOLDER ID | CONDITION | MONITORING SUBJECT FOLDER ID |
|---|---|---|
| F100 | Sub Folder.title=Document.title | F10 |
| F101 | Sub Folder.custom Date <Document.custom Date | F11 |
| F102 | Sub Folder.owner =Document.owner | F12 |
| F103 | (Sub Folder.title=Document.title) AND (Sub Folder.owner=Document.owner) | F13 |
| | | |

FIG. 2

| CONDITION-ASSOCIATED FOLDER ID | CONDITION | MONITORING SUBJECT FOLDER ID |
|---|---|---|
| F100 | Sub Folder.title=Document.title | F10 |
| F101 | Sub Folder.custom Date <Document.custom Date | F11 |
| F102 | Sub Folder.owner =Document.owner | F12 |
| F103 | (Sub Folder.title=Document.title) AND (Sub Folder.owner=Document.owner) | F13 |
| | | |

FIG. 3

| SUBORDINATE FOLDER ID | TITLE (FOLDER NAME) | SETTING DATE | OWNER |
|---|---|---|---|
| SF1000 | A | 2010.1.1 | USER A |
| SF1001 | B | 2010.2.1 | USER B |
| | | | |

INFORMATION MANAGING APPARATUS AND COMPUTER-READABLE MEDIUM IN A MULTI-LAYER FILE SYSTEM

CROSS-REFERENCE TO RELATED APPLICATION

This application is based on and claims priority under 35 USC119 from Japanese Patent Application No. 2010-033601 filed on Feb. 18, 2010.

BACKGROUND

1. Technical Field

The present invention relates to an information managing apparatus and a computer-readable medium.

2. Related Art

There is an operation of distributing data to storage destinations that are selected according to their contents or attributes.

SUMMARY

According to an aspect of the invention, an information managing apparatus includes an acquiring unit, a condition setting unit, a condition judging unit and a correlating unit. The acquiring unit acquires information from storage unit which stores information therein. The condition setting unit sets a condition on at least one layer of a file system for managing the information stored in the storage unit. Information to be correlated with the at least one layer satisfies the condition as said information locates under the at least one layer. The condition is referred along with an attribute value of one or a plurality of lower layers provided under the at least one layer. The condition judging unit judges whether or not the information acquired by the acquiring unit satisfies the condition set by the condition setting unit. The correlating unit correlates the information acquired by the acquiring unit with a lower layer if the condition judging unit judges that the acquired information satisfies the set condition when the attribute value of the lower layer is referred to. The lower layer is provided under the at least one layer and corresponds to the condition judged to be satisfied by the condition judging unit.

BRIEF DESCRIPTION OF THE DRAWINGS

Exemplary embodiments of the invention will be described in detail based on the following figures, wherein:

FIG. 2 shows an example condition setting table;

FIG. 3 shows example pieces of attribute information that are set for subordinate folders;

DETAILED DESCRIPTION

An embodiment of the present invention will be hereinafter described with reference to the drawings.

Figure 1:
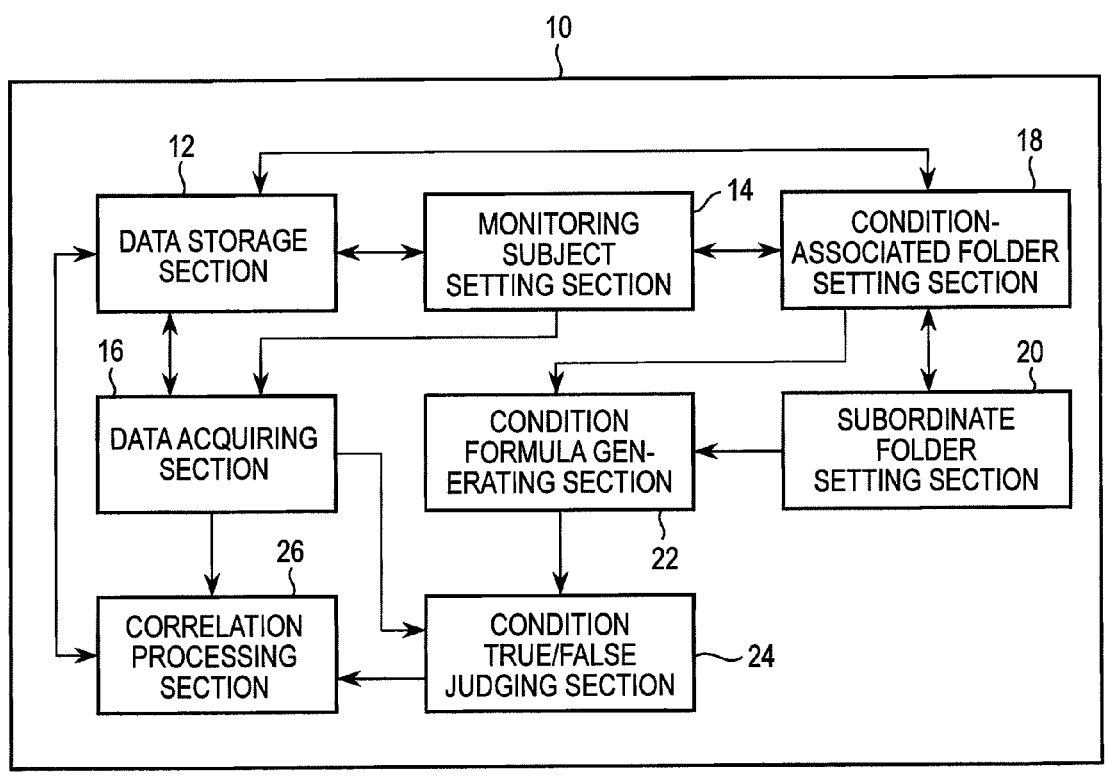
FIG. 1 is a functional block diagram of an information managing apparatus according to an embodiment.

FIG. 1 is a functional block diagram of an information managing apparatus 10 according to the embodiment. As shown in FIG. 1, the information managing apparatus 10 includes a data storage section 12, a monitoring subject setting section 14, a data acquiring section 16, a condition-associated folder setting section 18, a subordinate folder setting section 20, a condition formula generating section 22, a condition true/false judging section 24, and a correlation processing section 26. The functions of these sections may be implemented in such a manner that a computer having a control unit such as a CPU and a storage unit such as a memory reads programs from a computer-readable information storage medium and runs them. The programs may be supplied to the information managing apparatus 10 having computer hardware via either an information storage medium or a data communicating unit such as the Internet. At least the control unit is executed by a processor as the CPU of the information managing apparatus 10.

The data storage section 12, which is implemented as, for example, a storage device such as a magnetic disk device or a semiconductor memory, stores data to be processed by the information managing apparatus 10. There are no particular restrictions on the kind and form of data to be processed by the information managing apparatus 10, and data to be processed by the information managing apparatus 10 may include e-mails, electronic documents, image data, etc. In the embodiment, the data storage section 12 may be managed as a file system having a layered structure of plural folders (layers).

The monitoring subject setting section 14 serves to set a folder (monitoring subject folder) to be monitored by the information managing apparatus 10 among the folders of the data storage section 12. Rather than one monitoring subject folder, plural monitoring subject folders may be set. In the embodiment, the monitoring subject folder functions as a temporary storage location of data acquired by the information managing apparatus 10. And data stored in the monitoring subject folder is made a subject to be correlated with (stored in) another folder according to prescribed conditions. The data correlating and the related conditions will be described later in detail.

The data acquiring section 16 serves to acquire data from the monitoring subject folder that has been set by the monitoring subject setting section 14. In the embodiment, the data acquiring section 16 may either acquire data that has been newly registered in the monitoring subject folder or select or acquire unacquired data by accessing the monitoring subject folder every predetermined time.

The condition-associated folder setting section 18 serves to set a condition-associated folder in the file system that is managed by the information managing apparatus 10. A condition-associated folder may be either newly generated in the file system or set by changing an existing folder to a condition-associated folder. The condition-associated folder is a folder for which a condition is set that should be satisfied by data to be correlated with it as data located under it. As for the condition that is set for the condition-associated folder, a condition formula is defined that should be satisfied by data to be correlated with each of one or plural subordinate folders when its attribute value is referred to.

FIG. 2 shows an example condition setting table showing conditions that are set for respective condition-associated folders. As shown in FIG. 2, the condition setting table may be configured as a table which contains conditions each of which is set for a condition-associated folder and identification information of a monitoring subject folder that is stored with data to be taken into the condition-associated folder in such a manner that these pieces of information are correlated with identification information of the condition-associated folder (condition-associated folder ID).

In the example of FIG. 2, the condition that is set for the condition-associated folder having a condition-associated folder ID "F100" is that the title of data should be the same as that of a subordinate folder. The condition that is set for the condition-associated folder having a condition-associated folder ID "F101" is that a date that is set for a subordinate folder should be before a generation date of data. The condition that is set for the condition-associated folder having a condition-associated folder ID "F102" is that the owner of data should be the same as that of a subordinate folder. The condition that is set for the condition-associated folder having a condition-associated folder ID "F103" is that the title of data should be the same as that of a subordinate folder and the owner of the data should be the same as that of the subordinate folder.

The subordinate folder setting section 20 serves to set a subordinate folder under a condition-associated folder. In addition to a title (name), attributes values of respective pieces of attribute information that are predetermined for subordinate folders may be set for each subordinate folder. Pieces of information that can be acquired by the information managing apparatus 10, such as a generation date and an owner, may be used as attribute values as they are. Alternatively, each attribute value may be input by the user or changed according to information that is input by the user.

FIG. 3 shows example pieces of attribute information that are set for subordinate folders. As seen from FIG. 3, attribute values of various kinds of attribute information such as a title, a setting date, and an owner are set so as to be correlated with identification information (subordinate folder ID) of each subordinate folder. The setting date may be either a subordinate folder generation date or arbitrary date/time information that is set by the user as appropriate.

The condition formula generating section 22 generates a condition formula corresponding to each subordinate folder provided under a condition-associated folder on the basis of a condition that is set for the condition-associated folder and the attribute values of the subordinate folder. A condition formula is generated on the basis of a relationship between a subordinate folder and a condition-associated folder superior to it and a relationship between the condition-associated folder and another condition-associated folder superior to it. More specifically, for example, if plural parallel condition-associated folders are located above a subordinate folder, the conditions of these condition-associated folders are combined by ORing them. If plural series condition-associated folders are located above a subordinate folder (i.e., there is a condition-associated folder having another condition-associated folder below), the conditions of these condition-associated folders are combined by ANDing them. Specific examples of condition formulae to be generated by the condition formula generating section 22 will be described below.

Figure 4:
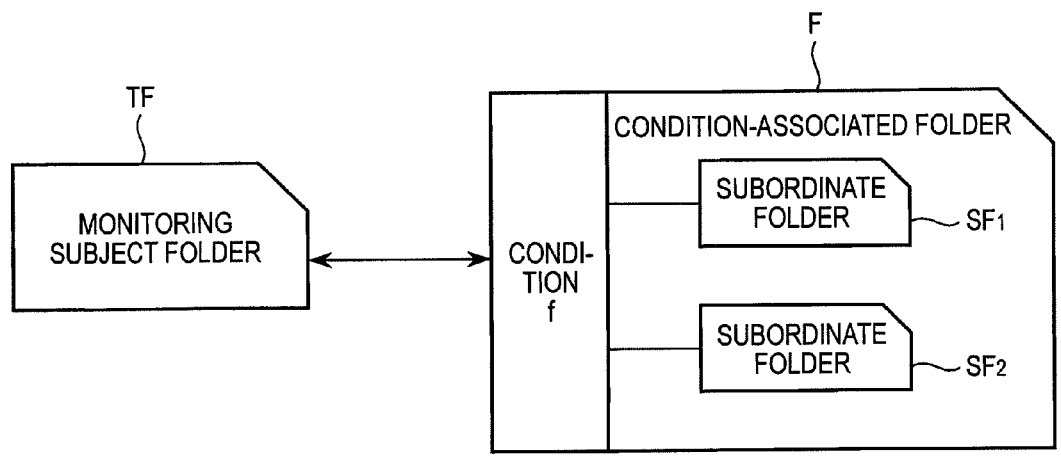
FIG. 4 shows example relationships between a monitoring subject folder, a condition-associated folder, and subordinate folders.

FIG. 4 shows example relationships between a monitoring subject folder, a condition-associated folder, and subordinate folders. In the example of FIG. 4, subordinate folders $SF_1$ and $SF_2$ are provided under one condition-associated folder F. A condition formula of the condition-associated folder F is generated as $f(\alpha, \beta_i)$ by using a condition sentence (function) f which is set for the condition-associated folder F, where $\alpha$ is an attribute value of data acquired from a monitoring subject folder TF and $\beta_i$ is attribute values of the subordinate folders $SF_i$ (i=1, 2).

Figure 5:
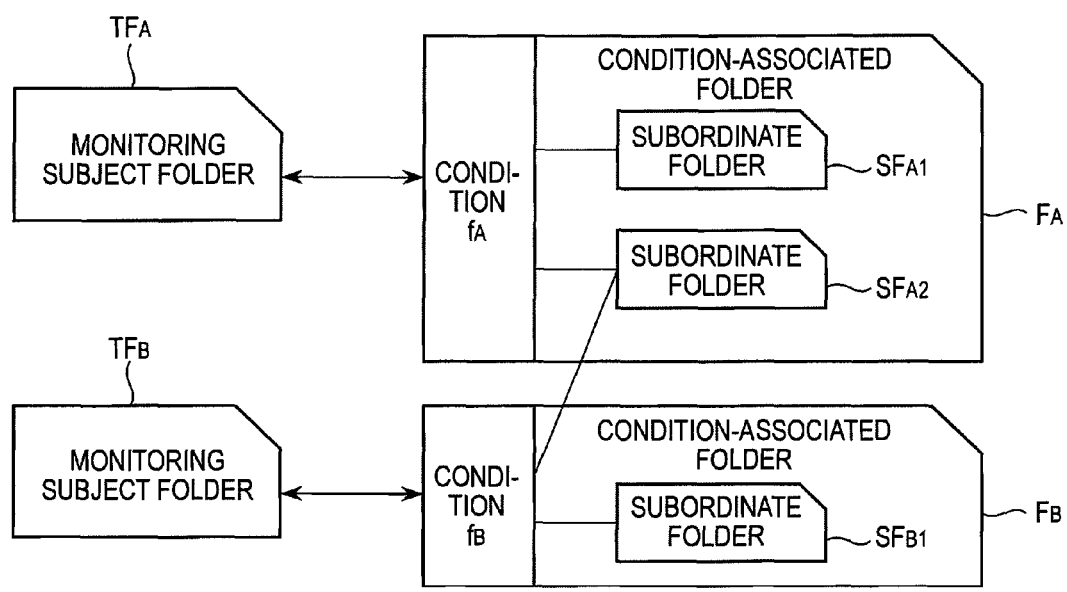
FIG. 5 shows example relationships between monitoring subject folders, condition-associated folders, and subordinate folders.

FIG. 5 shows example relationships between monitoring subject folders, condition-associated folders, and subordinate folders. In the example of FIG. 5, there are two condition-associated folders $F_A$ and $F_B$. Subordinate folders $SF_{A1}$ and $SF_{A2}$ are provided under the condition-associated folder $F_A$ having a monitoring subject folder $TF_A$ as a monitoring subject. A subordinate folder $SF_{B1}$ is provided under the condition-associated folder $F_B$ having a monitoring subject folder $TF_B$ as a monitoring subject. The subordinate folder $SF_{A2}$ is also located under the condition-associated folder $F_B$. Condition formulae corresponding to the subordinate folders $SF_{A1}$ and $SF_{B1}$ are generated as $f_A(\alpha, \beta_{A1})$ and $f_B(\alpha, \beta_{B1})$, respectively, where $f_A$ and $f_B$ are condition sentences of the respective condition-associated folders $F_A$ and $F_B$. A condition formula for the subordinate folder $SF_{A2}$ is generated as $f_A(\alpha, \beta_{A2})$ OR $f_B(\alpha, \beta_{A2})$. Symbol "OR" is a logical summation operator.

Figure 6:
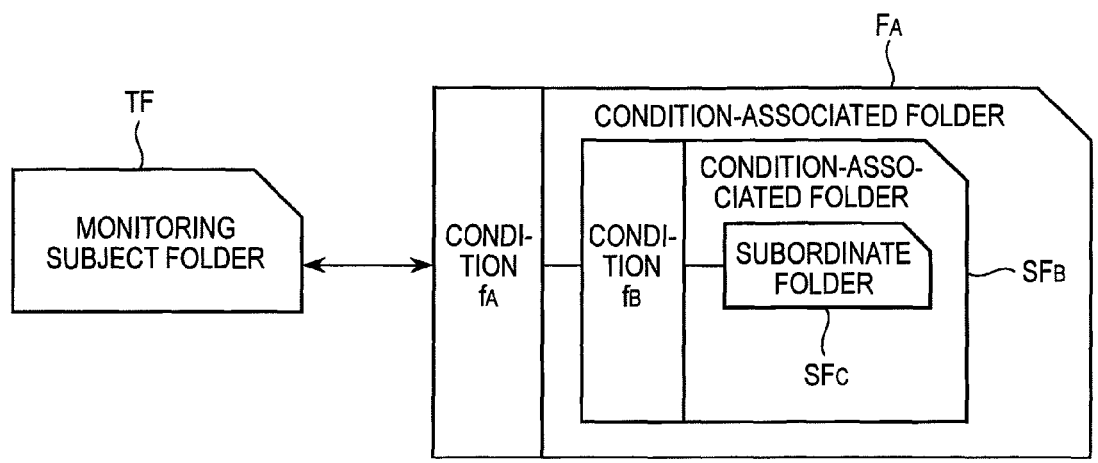
FIG. 6 shows example relationships between a monitoring subject folder, condition-associated folders, and a subordinate folder.

FIG. 6 shows example relationships between a monitoring subject folder, condition-associated folders, and a subordinate folder. In the example of FIG. 6, there are two condition-associated folders $F_A$ and $F_B$. The condition-associated folder $F_B$ is provided under the condition-associated folder $F_A$ having a monitoring subject folder TF as a monitoring subject, and a subordinate folder $SF_C$ is provided under the condition-associated folder $F_B$. A condition formula corresponding to the subordinate folder $SF_C$ is generated as $f_A(\alpha, \beta_C)$ AND $f_B(\alpha, \beta_C)$, where $f_A$ and $f_B$ are condition sentences of the respective condition-associated folders $F_A$ and $F_B$. Symbol "AND" is a logical multiplication operator.

The condition true/false judging section 24 serves to judge whether condition formulae that are generated by the condition formula generating section 22 for respective subordinate folders are true or false for each data acquired by the data acquiring section 16. For example, if data having a data name A is acquired from the monitoring subject folder of the condition-associated folder having the ID "F100" and subordinate folders $SF_A$ and $SF_B$ have titles "A" and "B," respectively, the condition formula corresponding to the subordinate folder $SF_A$ is judged true and the condition formula corresponding to the subordinate folder is $SF_B$ is judged false.

If the condition true/false judging section 24 judges that a certain condition formula is true for data acquired by the data acquiring section 16, the correlation processing section 26 correlates the acquired data with the subordinate folder corresponding to that condition formula. If condition formulae corresponding to plural subordinate folders are judged true for data, the data may be correlated with each of the plural subordinate folders. If a subordinate folder exists that is correlated with data, the data may be deleted from the monitoring subject folder (i.e., the correlation is canceled). Correlating data with a folder may be moving, copying, or storing the data to or in the folder.

Next, a data correlation process which is executed in the information managing apparatus 10 will be described with reference to a flowchart of FIG. 7.

Figure 7:
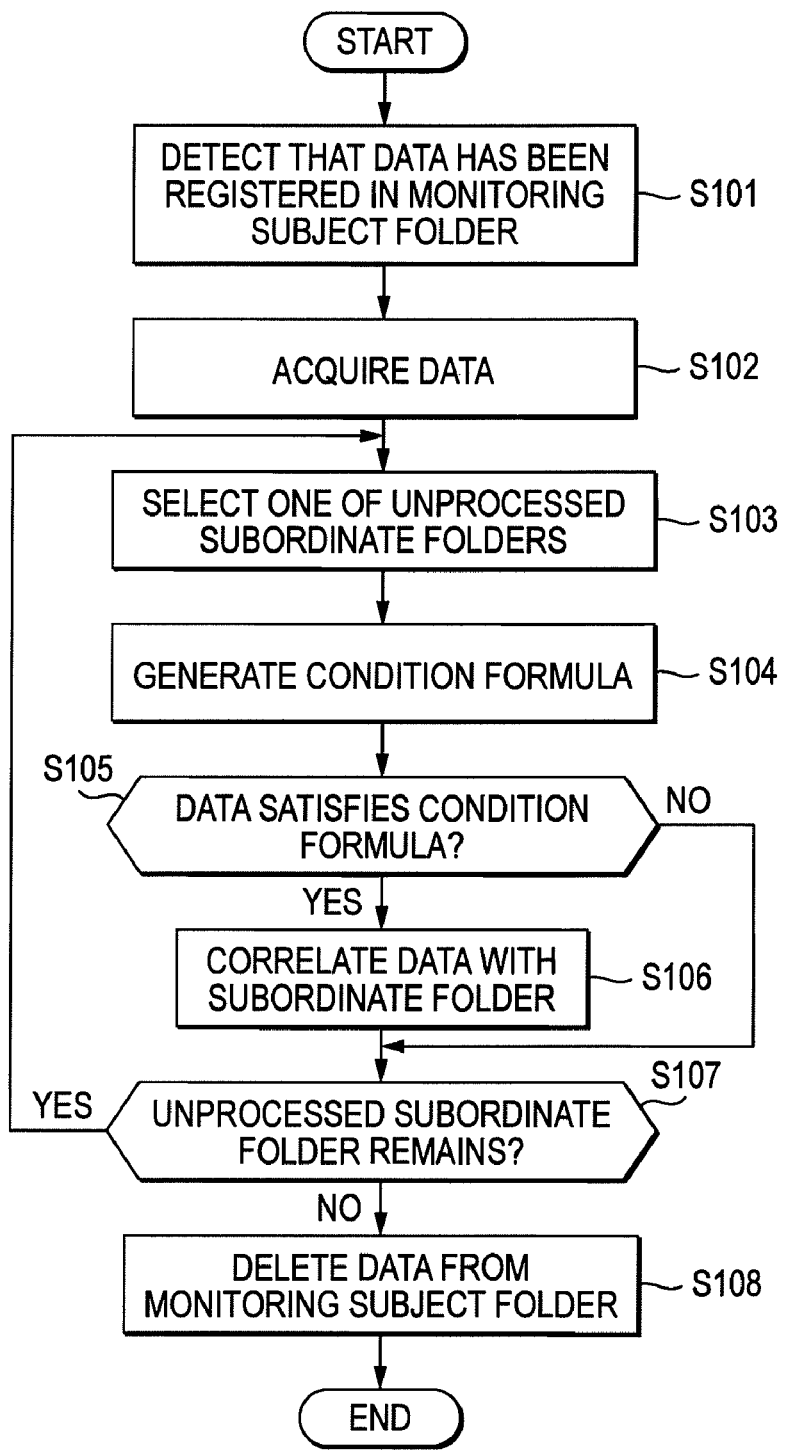
FIG. 7 is a flowchart of a data correlation process.

As shown in FIG. 7, the information managing apparatus 10 detects, at step S101, that data has been registered in a monitoring subject folder and acquires the registered data at step S102. At step S103, the information managing apparatus 10 selects one of unprocessed subordinate folders that are located under a condition-associated folder having the monitoring subject folder as a monitoring subject.

At step S104, the information managing apparatus 10 generates a condition formula on the basis of an attribute value of the selected subordinate folder and the condition that is set for the condition-associated folder having the selected subordinate folder below. At step S105, the information managing apparatus 10 judges whether or not the acquired data satisfies the condition formula generated for the selected subordinate folder. If it is judged that the acquired data satisfies the condition formula (S105: yes), the acquired data is correlated with the selected subordinate folder at step S106 and it is judged at step S107 whether or not an unprocessed subordinate folder remains. If it is judged that the acquired data does not satisfy the condition formula (S105: no), the process moves to step S107 skipping step S106.

If it is judged that an unprocessed subordinate folder remains (S107: yes), the process returns to step S103. If it is judged that no unprocessed subordinate folder remains (S107: no), the information managing apparatus 10 deletes the acquired data from the monitoring subject folder at step S108 and finishes the process. If plural data are acquired at step S102, steps S103-S107 are executed for each of the plural data.

In the information managing apparatus 10 according to the embodiment, a data-correlating condition is set for each folder. Therefore, what condition data that is correlated with (stored in) a folder satisfies can be checked more easily than in a case that no such condition is set for each folder. Furthermore, where a condition is set for each folder, when conditions to be set are complex, they can be managed more easily than in a case that conditions and folders are provided independently of each other.

The invention is not limited to the above embodiment. For example, the information managing apparatus 10 may perform pieces of processing of acquiring data from a database server, a file server, an e-mail server, or the like, storing the acquired data temporarily in a monitoring subject folder, and determining what folder the stored data should be correlated with.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information managing apparatus in a multi-layer file system comprising:
   at least one computer processor configured to execute a plurality of units comprising:
      an acquiring unit that acquires information stored in a storage unit;
      a condition setting unit that sets a plurality of conditions on at least one layer and an attribute value of at least one subordinate layer provided subordinate to the at least one layer of the file system which manages the information stored in the storage unit, wherein:
         at least one subset of the stored information must satisfy at least one of the set conditions in order to be correlated with the at least one layer as information located subordinate to the at least one layer, and
         the at least one subset of the stored information must satisfy the set attribute value in order to be correlated with the at least one subordinate layer;
      a condition judging unit that judges whether or not acquired information satisfies at least two of the set conditions; and
      a correlating unit that correlates the acquired information with the at least one subordinate layer only when:
         the condition judging unit judges that the acquired information satisfies the at least two of the set conditions; and
         the acquired information satisfies the set attribute value of the at least one subordinate layer,
      wherein:
         the condition setting unit generates a condition formula describing each respective folder that is subordinate to at least one condition-associated folder provided on the at least one layer,
         the at least one condition-associated folder is a folder for which at least a condition must be satisfied by information to be correlated with the folder as information located under the folder, and
         the condition formula is based on elements comprising:
            a respective one of the plurality of conditions that is set for the at least one condition-associated folder; and
            an attribute value of the respective folder that is subordinate to the at least one condition-associated folder, wherein:
         the at least one layer comprises a first condition-associated folder $f_A$ and a second condition-associated folder $f_B$,
         a subordinate folder $SF_{A2}$ is provided subordinate to the first condition-associated folder $f_A$,
         the subordinate folder $SF_{A2}$ is also provided subordinate to the second condition-associated folder $f_B$,
         the condition setting unit generates a condition formula for the subordinate folder $SF_{A2}$ comprising $f_A(\alpha, \beta_{A2})$ OR $f_B(\alpha, \beta_{A2})$,
         $\alpha$ is an attribute value corresponding to a respective monitoring subject folder, and
         $\beta$ is an attribute value corresponding to a respective subordinate folder.

2. The information managing apparatus according to claim 1, the units further comprising:
   a storage location setting unit that sets storage locations which store the information stored in the storage unit so that the storage locations are correlated with respective layers,
   wherein plural conditions are set for each of the respective layers by the condition setting unit, and
   wherein the at least one subordinate layer is provided subordinate to one of the respective layers that is correlated with a respective one of the set storage locations.

3. The information managing apparatus according to claim 1, wherein:
   the storage unit stores received information,
   the acquiring unit acquires newly stored information from the storage unit, and
   the information correlated with the at least one subordinate layer by the correlating unit is deleted from the storage unit.

4. The information managing apparatus according to claim 1, wherein the acquiring unit acquires substantially all information that is newly stored in the storage unit.

5. The information managing apparatus according to claim 1, wherein a plurality of condition-associated folders are provided on the at least one layer, and
   wherein the condition setting unit generates the condition formula for each respective folder that is subordinate to the plurality of condition-associated folders by using an OR operator as a logical operator combining the plurality of condition-associated folders.

6. The information managing apparatus according to claim 1, wherein the condition setting unit generates the condition formula for each respective folder that is subordinate to a series of the plurality of condition-associated folders by using an AND operator as a logical operator combining the series of plural condition-associated folders.

7. A non-transitory computer-readable storage medium storing a program that causes a computer to execute information managing in a multi-level file system, the information managing comprising:

acquiring information stored in a storage unit;

setting a plurality of conditions on at least one layer of the file system which manages the information stored in the storage unit, wherein:
- a subset of the stored information must satisfy at least one of the set conditions in order to be correlated with the at least one layer as information located subordinate to the at least one layer, and
- the acquired information satisfies at least two of the set conditions;

setting an attribute value of at least one subordinate layer provided subordinate to the at least one layer,
wherein the subset of the stored information must satisfy the set attribute value in order to be correlated with the at least one subordinate layer;

judging whether or not the acquired information satisfies the two of the set conditions; and correlating the acquired information with the at least one subordinate layer only when:
- the judging judges that the acquired information satisfies the at least two of the set conditions; and
- the acquired information satisfies the set attribute value of the at least one subordinate layer, wherein the information managing further comprises generating a condition formula describing each respective folder that is subordinate to a condition-associated folder provided on the at least one layer, wherein the condition formula is based on elements comprising:
- a respective one of the plurality of conditions that is set for the condition-associated folder; and
- an attribute value of the respective folder that is subordinate to the condition-associated folder, wherein:
- the at least one layer comprises a first condition-associated folder $f_A$ and a second condition-associated folder $f_B$,
- a subordinate folder $SF_{A2}$ is provided subordinate to the first condition-associated folder $f_A$,
- the subordinate folder $SF_{A2}$ is also provided subordinate to the second condition-associated folder $f_B$,
- the information managing further comprises generating a condition formula for the subordinate folder $SF_{A2}$ comprising $f_A(\alpha, \beta_{A2})$ OR $f_B(\alpha, \beta_{A2})$,
- $\alpha$ is an attribute value corresponding to a respective monitoring subject folder, and
- $\beta$ is an attribute value corresponding to a respective subordinate folder.

* * * * *